Patented Jan. 8, 1929.

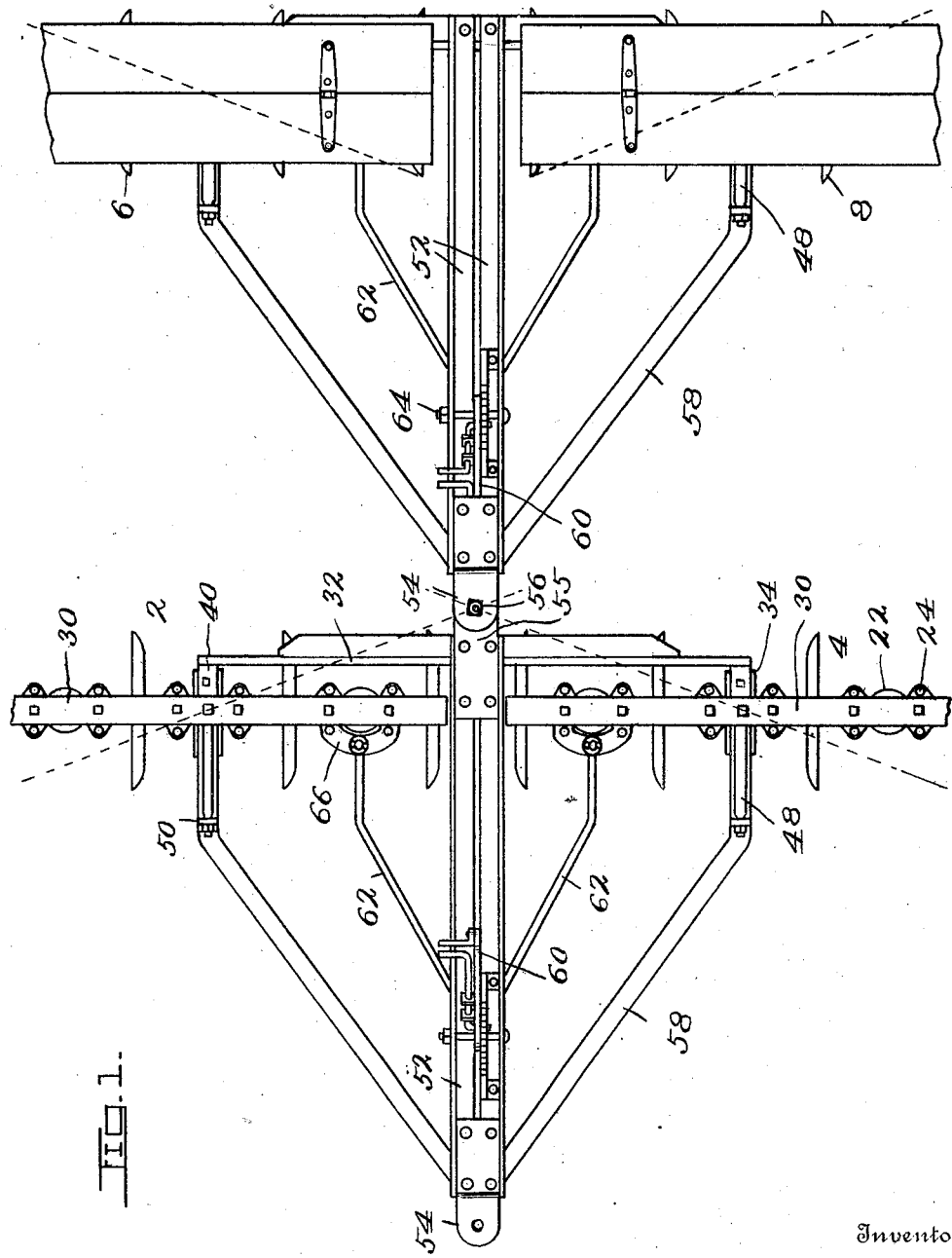

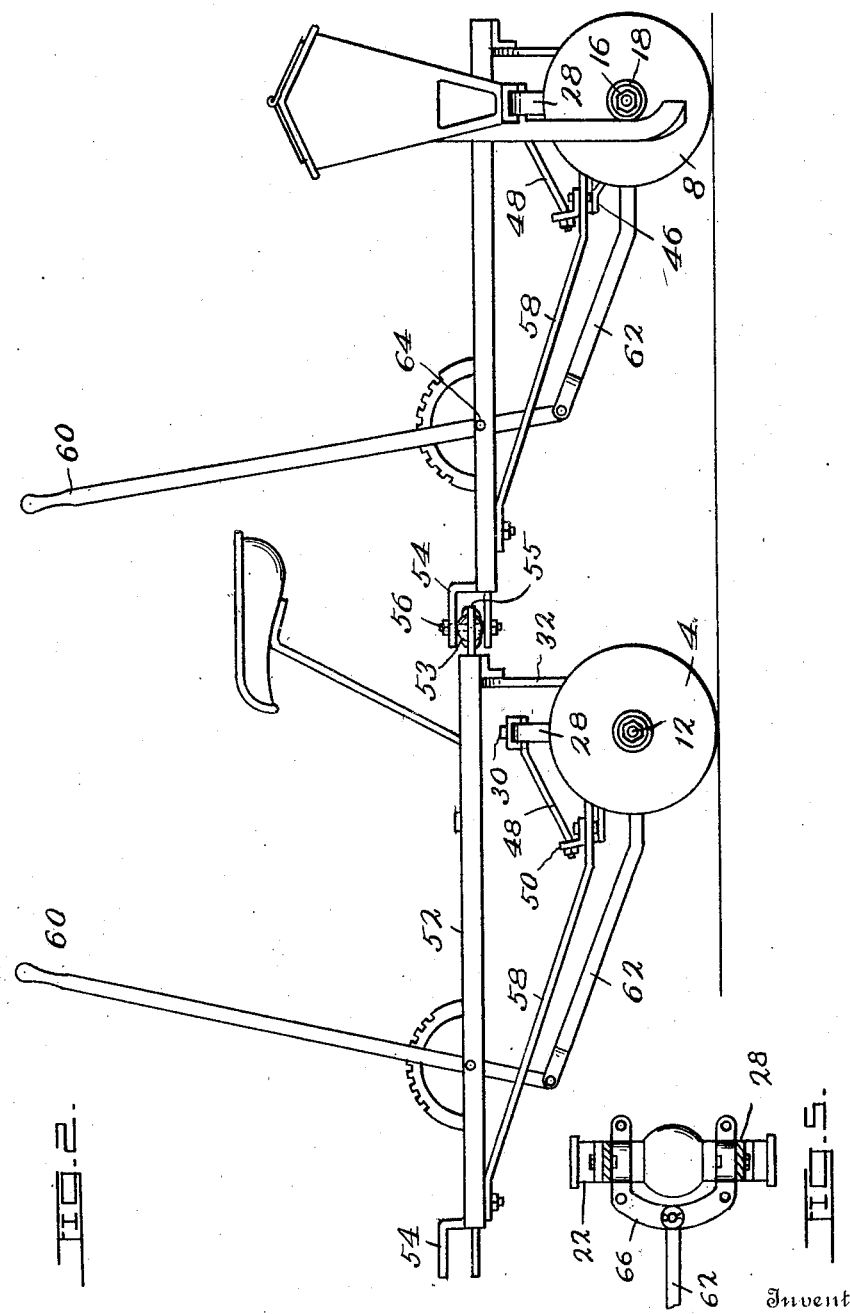

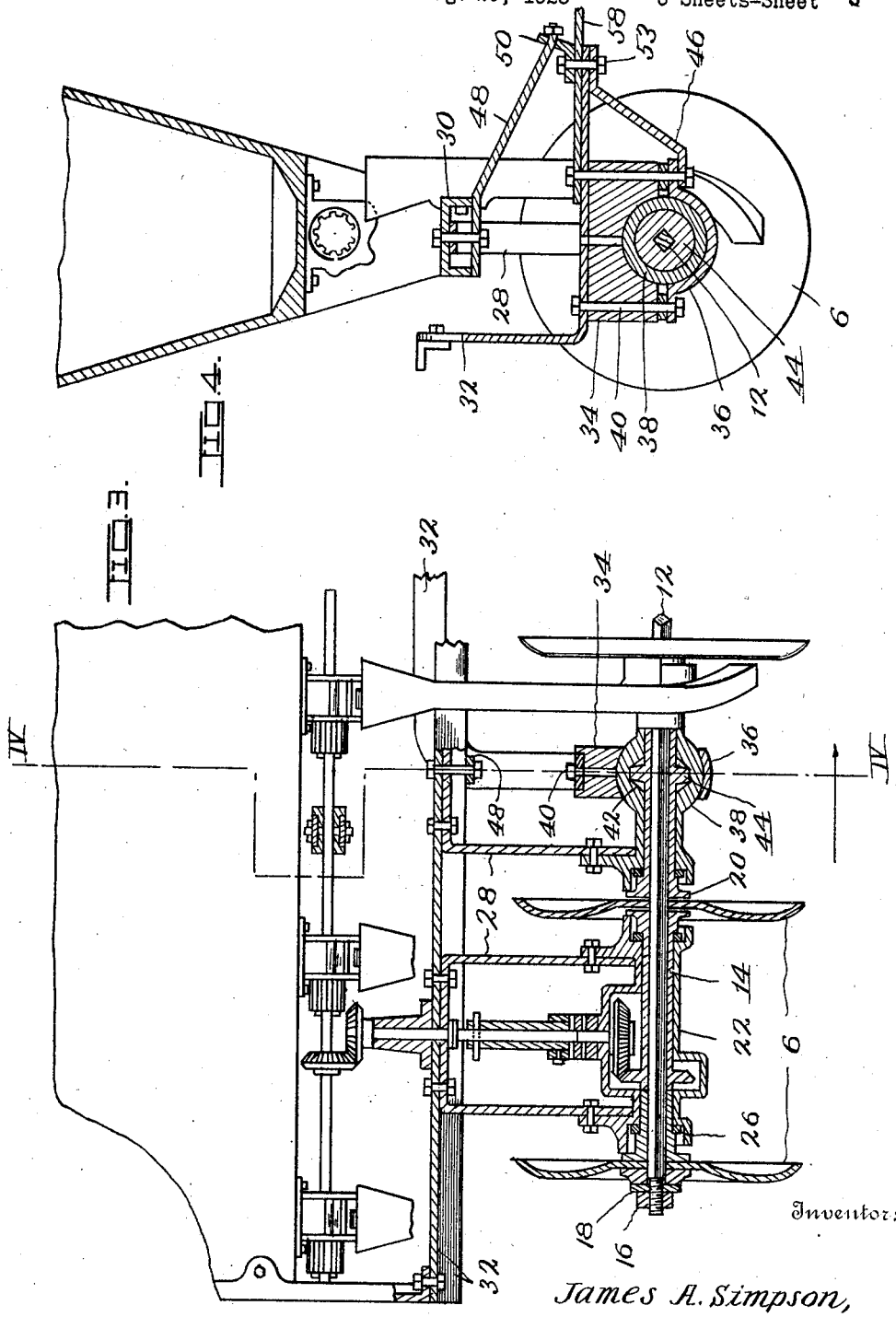

1,698,175

UNITED STATES PATENT OFFICE.

JAMES A. SIMPSON, OF GRINNELL, KANSAS.

DISK SEEDER.

Application filed August 25, 1923. Serial No. 659,243.

My invention relates to disk seeding machines of the type that form furrows in the ground, drop seed into said furrows and then cover the same.

One feature of the invention resides in spacing the disks farther apart than in the ordinary seed drill in order to leave the relatively wide strips of land between the rows undisturbed. This is an important feature in planting in relatively dry and sandy soils the surface of which, if cultivated, is readily blown away in windy weather, the seed often being carried away with the soil.

Another important feature of the invention resides in universal mountings for the disk shafts of the different gangs which mountings render the machine flexible and enable the disks to enter the soil at uniform depth on level or unlevel ground. This feature also lightens the draft of the machine and enables the disks of the different gangs to be readily adjusted to different angles to cut to different depths.

Other features will hereinafter appear, and in order that the invention may be fully understood, reference will now be had to the accompanying drawings, in which:

Fig. 1 is a broken plan view of the machine.
Fig. 2 is a side elevation of the machine.
Fig. 3 is an enlarged broken sectional view of a portion of one of the gangs.
Fig. 4 is a vertical section on line IV—IV of Fig. 3.
Fig. 5 is a detail plan view of a draft connection employed in carrying out the invention.

In the preferred construction of the machine, four gangs of disks 2, 4, 6 and 8, are employed and each gang is capable of a certain amount of independent vertical movement which enables the disks of the different gangs to accommodate themselves to uneven ground and form furrows of uniform depth.

As all of the gangs are substantially alike, excepting that the two rear gangs 6 and 8 are equipped with the seed sowing mechanism, I will proceed to describe the two rear gangs in detail. The disks 6 and 8 are of concavo-convex form in cross section and those of each gang are mounted upon a square shaft 12, which they rotate by reason of their contact with the soil.

The disks of each gang are spaced apart by journals 14, Fig. 3, which have square bores to receive the shaft 12 in order to be rotated thereby. Nuts and washers 16 and 18, respectively, on the ends of the shaft 12 hold the disks 6 and the journals 14 in assembled position. The journals 14 are flanged at each end as indicated at 20 to overcome any tendency of the disks 6 to wabble on the shaft 12, and each journal 14 is mounted in a bearing 22 formed in two longitudinal halves removably connected by bolts 24, so that they may be readily placed in position upon or removed from said journals 14.

The journals 14 are provided near their ends with leather or other suitable gaskets 26 to retain a lubricant in the bearings 22 and also to exclude dust. Each bearing 22 is secured to the lower ends of a yoke 28 and the yokes of each gang are firmly united at their upper portions by means of a channel or other bar 30.

In order that the gangs 6 and 8 may rock longitudinally and independently of each other to accommodate themselves to uneven ground and permit of their adjustment to different angles relative to the forward travel of the machine, said gangs 6 and 8 are flexibly connected by an arch 32, boxes 34 secured to the lower portions of said arch 32, straps 36, and balls or spherical protuberances 38, Figs. 3 and 4, one of which is formed integral with or otherwise secured to one bearing 22 of each gang. The boxes 34 and the straps 36 are connected by suitable means such as bolts 40, and have concave surfaces to fit the associate ball 38, so that the same may turn in any direction. Each ball 38 has an annular recess 42 to receive a circular shoulder 44 on the associate journal 14 to prevent the same from moving longitudinally and coming into undue frictional contact with the disks at the ends of said journal.

The lower ends of the arch 32 extend forwardly from the boxes 34 to which they are further secured by braces 46, Fig. 4. Braces 48 are employed to retain the yokes 28 in upright or approximately upright position. Said braces 48 are connected at their upper ends to the bars 30 at points above the centers of the balls 38 and loosely connected at their lower ends to brackets 50, so as not to interfere with the movement of said balls 38 in their sockets.

The arch 32 is rigidly secured at its upper central portion to a forwardly extending beam 52 provided at its forward end with a clevis 54 to receive a pivot 56 whereby it is connected to a coupling 55 on the rear end of the beam 52 of the forward gangs 2 and 4. A ball washer 53 carries the pivot 56 to enable the same to turn in any direction in the coupling 55 and thus afford a flexible connection between the forward and rear gangs. The arch 32 is further connected to the beam 52 by means of draft-bars 58 secured at their rear ends to the ends of said arch 32 and at their forward ends to the forward portion of the beam 52, Figs. 1 and 2. Suitable means such as bolts 53 are employed to connect the arch 32, the braces 46, the brackets 50, and the draft-bars 58 together.

In order to cause the disks to cut furrows at the desired depth the gangs are adjusted obliquely to the line of travel of the machine as indicated by dotted lines, Fig. 1, through the intermediacy of hand levers 60 and connecting bars 62. The hand levers 60 are fulcrumed on pivots 64, secured to the beams 52 of the forward and rear gangs, while the connecting bars 62 are, preferably, connected at their forward ends to their respective hand levers 60 and at their rear ends to U-shaped members 66 one of which is mounted on a bearing 22 of each gang. By connecting the hand levers 60 through the intervening mechanism to the adjacent ends of each pair of gangs and locating the balls 38 and their sockets at approximately midway between the ends of each gang it is apparent that the gangs can be adjusted to different angles as above stated without undue exertion on the part of the operator.

In some instances the front and rear sections of the machine may be uncoupled and used independently of each other, but more efficient results can be had by using the complete machine.

From the foregoing description it will be understood that I have produced a machine well adapted for the purpose intended and while I have shown and described the preferred embodiment of the invention, I reserve the right to make such changes in the construction, combination and arrangement of parts as properly fall within the spirit and scope of the appended claims.

Having thus described my invention, what I claim and desire to secure by Letters Patent, is:

1. In a machine of the character described, two gangs arranged at opposite sides of a central draft line and consisting of rotary disks, journals spacing the disks of each gang apart, bearings in which said journals are mounted, a box in which one bearing of each gang has universal movement to allow free movement of the respective gangs, an arch rigidly connected at its ends to said boxes, a forwardly projecting beam rigidly connected to the central portion of said arch, draft bars rigidly connected at their ends to the boxes and said beam, and manually controlled mechanism mounted on the beam and connected to a bearing of each gang to adjust the latter at different angles to the line of draft.

2. In a machine of the character described, two gangs arranged at opposite sides of a central draft line and consisting of rotary disks, journals spacing the disks of each gang apart, bearings in which said journals are mounted, means projecting into one of the bearings from one of said journals for preventing independent longitudinal movement of the latter, a box in which one bearing of each gang has universal movement to allow free movement of the respective gangs, an arch rigidly connected at its ends to said boxes, a forwardly projecting beam rigidly connected to the central portion of said arch, draft bars rigidly connected at their ends to the boxes and said beam, manually controlled mechanism mounted on the beam and connected to a bearing of each gang to adjust the same on the spherical protuberances at different angles to the line of draft, yokes extending upwardly from the bearings, a bar uniting the yokes of each gang, and braces connected at their ends to the last-mentioned bars and said draft bars.

3. In a machine of the character described, two gangs arranged at opposite sides of a central draft line and consisting of rotary disks, journals spacing the disks of each gang apart, bearings in which said journals are mounted, a box in which one bearing of each gang has universal movement to allow free movement of the respective gangs, an arch rigidly connected at its ends to said boxes, a forwardly projecting beam rigidly connected to the central portion of said arch, draft bars rigidly connected at their ends to the boxes and said beam, manually controlled mechanism mounted on the beam and connected to a bearing of each gang to adjust the latter at different angles to the line of draft, and two additional gangs having a beam freely connected to the forward end of the first-mentioned beam.

In testimony whereof I affix my signature.

JAMES A. SIMPSON.